(12) United States Patent
Honjo

(10) Patent No.: US 11,447,036 B2
(45) Date of Patent: Sep. 20, 2022

(54) TEMPERATURE ADJUSTMENT CIRCUIT AND CONTROL METHOD THEREOF

(71) Applicant: HONDA MOTOR CO., LTD., Tokyo (JP)

(72) Inventor: Takuya Honjo, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 328 days.

(21) Appl. No.: 16/720,984

(22) Filed: Dec. 19, 2019

(65) Prior Publication Data

US 2020/0198497 A1 Jun. 25, 2020

(30) Foreign Application Priority Data

Dec. 21, 2018 (JP) .............................. JP2018-240231

(51) Int. Cl.
*B60L 58/26* (2019.01)
*B60K 11/04* (2006.01)
(Continued)

(52) U.S. Cl.
CPC .............. *B60L 58/26* (2019.02); *B60K 11/04* (2013.01); *H01M 10/613* (2015.04);
(Continued)

(58) Field of Classification Search
CPC ... B60L 58/26; H01M 10/613; H01M 10/625; H01M 10/63; H01M 10/6568;
(Continued)

(56) References Cited

U.S. PATENT DOCUMENTS 6,360,835 B1 * 3/2002 Skala ................ H01M 8/04029
180/65.22
8,336,319 B2 * 12/2012 Johnston ............... B60L 3/0046
62/79
(Continued)

FOREIGN PATENT DOCUMENTS

| JP | 2010-007953 A | 1/2010 |
| JP | 2013-188098 A | 9/2013 |
| JP | 2018-124021 A | 8/2018 |

OTHER PUBLICATIONS

Sep. 29, 2020, Japanese Office Action issued for related JP application No. 2018-240231.

*Primary Examiner* — Tho V Duong
*Assistant Examiner* — Raheena R Malik
(74) *Attorney, Agent, or Firm* — Paratus Law Group, PLLC

(57) ABSTRACT

A vehicle includes a temperature adjustment circuit includes a first temperature adjustment circuit; a second temperature adjustment circuit; a first pump configured to circulate a heat medium; a coupling path that couples the first temperature adjustment circuit and the second temperature adjustment circuit; a first switching unit capable of switching between a circulation state in which the heat medium circulates in the coupled circuit and a non-circulation state; a first branch path configured to bypass a part of the coupled circuit; and a first connection portion and a second connection portion connecting the first branch path and the coupled circuit. The second connection portion is located upstream of the first connection portion in a flow direction of the heat medium that flows through the first branch path, and the first pump is disposed between an outlet of the heat medium of the battery and the second connection portion.

6 Claims, 8 Drawing Sheets

(51) Int. Cl.
*H01M 10/613* (2014.01)
*H01M 10/625* (2014.01)
*H01M 10/63* (2014.01)
*H01M 10/663* (2014.01)
*H01M 10/6568* (2014.01)
*B60K 1/04* (2019.01)
*B60K 1/00* (2006.01)

(52) U.S. Cl.
CPC ......... *H01M 10/625* (2015.04); *H01M 10/63* (2015.04); *H01M 10/6568* (2015.04); *H01M 10/663* (2015.04); *B60K 1/04* (2013.01); *B60K 2001/005* (2013.01); *B60K 2001/006* (2013.01); *B60K 2001/0438* (2013.01); *H01M 2220/20* (2013.01)

(58) Field of Classification Search
CPC . H01M 10/663; H01M 2220/20; B60K 11/04; B60K 1/04
USPC ......................................................... 165/43
See application file for complete search history.

(56) References Cited

U.S. PATENT DOCUMENTS

| | | | |
|---|---|---|---|
| 9,533,546 B2 * | 1/2017 | Cheng | B60K 1/04 |
| 9,533,547 B2 * | 1/2017 | Cheng | B60K 1/04 |
| 9,533,551 B2 * | 1/2017 | Cheng | B60H 1/00428 |
| 9,731,578 B2 * | 8/2017 | Johnston | B60H 1/00278 |
| 9,758,010 B2 * | 9/2017 | Johnston | B60H 1/3213 |
| 11,059,351 B2 * | 7/2021 | Zenner | B60H 1/00385 |
| 2008/0251235 A1 * | 10/2008 | Zhou | B60L 3/003 165/41 |
| 2012/0222441 A1 * | 9/2012 | Sawada | B60H 1/32284 62/238.1 |
| 2014/0193683 A1 * | 7/2014 | Mardall | H01M 10/625 429/99 |
| 2016/0107501 A1 | 4/2016 | Johnston | |

* cited by examiner

TEMPERATURE ADJUSTMENT CIRCUIT AND CONTROL METHOD THEREOF

CROSS-REFERENCE TO RELATED APPLICATIONS

This application is based on and claims priority under 35 USC 119 from Japanese Patent Application No. 2018-240231 filed on Dec. 21, 2018.

TECHNICAL FIELD

The present invention relates to a temperature adjustment circuit for adjusting a temperature of a battery or the like, and a control method thereof.

BACKGROUND ART

There has been a temperature adjustment circuit for an electric vehicle including: a first temperature adjustment circuit; a second temperature adjustment circuit; a first pump that circulates a heat medium in the first temperature adjustment circuit; a second pump that circulates the heat medium in the second temperature adjustment circuit; a coupling path that couples the first temperature adjustment circuit and the second temperature adjustment circuit to form a coupled circuit; and a switching unit capable of switching between a circulation state in which the heat medium circulates in the coupled circuit and a non-circulation state in which the heat medium does not circulate in the coupled circuit.

For example, JP-A-2013-188098 discloses a temperature adjustment circuit including: a cooling circuit that cools a battery; a cooling circuit that cools an inverter; a first refrigerant pump provided in the cooling circuit that cools a battery; a second refrigerant pump provided in the cooling circuit that cools an inverter; and a switching valve that switches between a state in which the battery and the inverter are subjected to temperature adjustment in the same circuit (hereinafter, also referred to as a circulation state) and a state in which the battery and the inverter are subjected to temperature adjustment in separate circuits (hereinafter, also referred to as a non-circulation state), in which the temperature adjustment circuit is set to the circulation state in a case where an outside air temperature is lower than a predetermined temperature, and is set to the non-circulation state in a case where the outside air temperature is equal to or higher than the predetermined temperature, so as to raise an accuracy of temperature adjustment.

However, in a temperature adjustment circuit in which two temperature adjustment circuits are coupled by a coupling path, there is a concern that when circulating a heat medium in one of the temperature adjustment circuits while the heat medium is circulating in the other of the temperature adjustment circuit, a supply pressure of the heat medium applied to a battery may increase. Therefore, it becomes problems that voltage withstand requirement of the battery, which has a relatively large component area, increases, as well as the cost or size of the battery.

SUMMARY

An aspect of the present invention provides a temperature adjustment circuit and a control method thereof that are capable of preventing increase in a supply pressure of a heat medium applied to a battery.

An embodiment of the present invention relates to a temperature adjustment circuit which includes:

a first temperature adjustment circuit configured to exchange heat with a battery;

a second temperature adjustment circuit configured to exchange heat with at least one of a motor and a power conversion device that supplies electric power to the motor;

a first pump configured to circulate a heat medium in the first temperature adjustment circuit;

a coupling path that couples the first temperature adjustment circuit and the second temperature adjustment circuit to form a coupled circuit;

a first switching unit capable of switching between a circulation state in which the heat medium circulates in the coupled circuit and a non-circulation state in which the heat medium does not circulate in the coupled circuit;

a first branch path configured to bypass a part of the coupled circuit; and a first connection portion and a second connection portion that are configured to connect the first branch path and the coupled circuit, the second connection portion is located upstream of the first connection portion in a flow direction of the heat medium that flows through the first branch path, and the first pump is disposed between an outlet of the heat medium of the battery and the second connection portion in the first temperature adjustment circuit Another embodiment of the present invention relates to a control method for a temperature adjustment circuit which includes:

a first temperature adjustment circuit configured to exchange heat with a battery;

a second temperature adjustment circuit configured to exchange heat with at least one of a motor and a power conversion device that supplies electric power to the motor;

a first pump configured to circulate a heat medium in the first temperature adjustment circuit;

a second pump configured to circulate the heat medium in the second temperature adjustment circuit;

a coupling path that couples the first temperature adjustment circuit and the second temperature adjustment circuit to form a coupled circuit;

a first switching unit capable of switching between a circulation state in which the heat medium circulates in the coupled circuit and a non-circulation state in which the heat medium does not circulate in the coupled circuit;

a first branch path configured to bypass a part of the coupled circuit; and a first connection portion and a second connection portion that are configured to connect the first branch path and the coupled circuit, the second connection portion is located upstream of the first connection portion when the heat medium flows through the first branch path, the first pump is disposed between an outlet of the heat medium of the battery and the second connection portion in the first temperature adjustment circuit, and when both the first pump and the second pump are operated from a stop state of the first pump and the second pump, operation of the first pump is started before operation of the second pump is started According to the above embodiment of the present invention, by disposing the first pump between the outlet of the heat medium of the battery and the second connection portion in the first temperature adjustment circuit, when circulating the heat medium in the first temperature adjustment circuit while the heat medium is circulating in the second temperature adjustment circuit, a supply pressure of the heat medium applied to a battery can be prevented from increasing.

DESCRIPTION OF EMBODIMENTS

First, an embodiment of the present invention will be described with reference to FIGS. 1 to 6.

[Temperature Adjustment Circuit]

Figure 1:
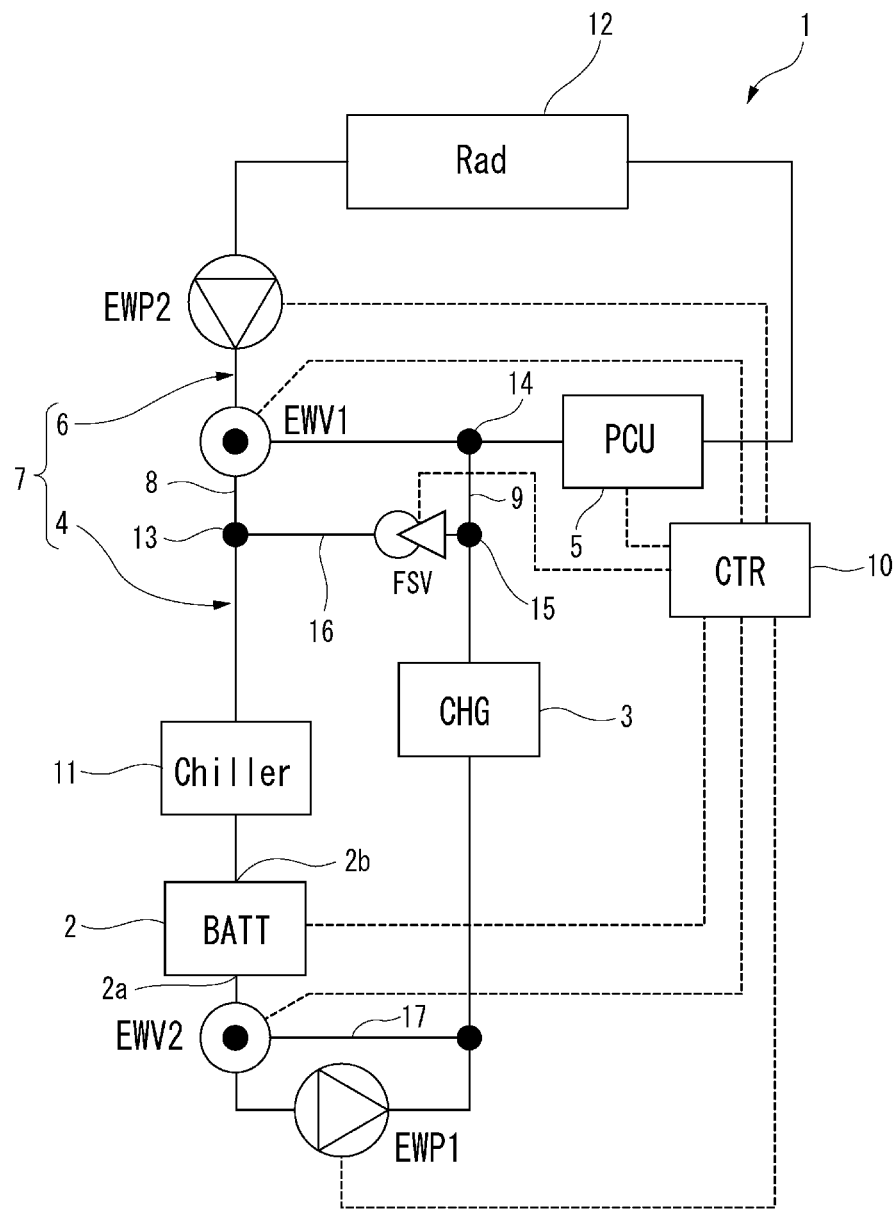
FIG. 1 is a circuit diagram showing a configuration of a temperature adjustment circuit according to an embodiment of the present invention.

As shown in FIG. 1, a temperature adjustment circuit 1 for an electric vehicle includes: a first temperature adjustment circuit 4 that exchanges heat with a battery 2 and a charger 3; a second temperature adjustment circuit 6 that exchanges heat with a power conversion device (power control unit) 5 that supplies electric power to a motor 105 (see FIG. 7); coupling paths 8, 9 that couple the first temperature adjustment circuit 4 and the second temperature adjustment circuit 6 to form a coupled circuit 7; a first electromagnetic switching valve EWV1 capable of switching between a series mode (circulation state) in which a heat medium circulates in the coupled circuit 7 and a separate mode (non-circulation state) in which the heat medium circulates in the separate temperature adjustment circuits 4, 6 without circulating in the coupled circuit 7; and a control device 10 that controls the first electromagnetic switching valve EWV1 and the like. The heat medium is a liquid medium such as water, a radiator liquid, or a coolant liquid.

[First Temperature Adjustment Circuit]

The first temperature adjustment circuit 4 includes: a first pump EWP1 that circulates the heat medium in the circuit; a charger 3 disposed downstream of the first pump EWP1; an electromagnetic check valve FSV disposed downstream of the charger 3; a chiller 11 that is disposed downstream of the electromagnetic check valve FSV and performs heat exchange using an air conditioning circuit of the electric vehicle; a battery 2 disposed downstream of the chiller 11; a second branch path 17 that bypasses the first pump EWP1 downstream of the chiller 11; and a second electromagnetic switching valve EWV2 capable of switching between a passage allowing state in which the heat medium passes through the second branch path 17 and a blocking state in which the heat medium does not pass through the second branch path 17.

Figure 3:
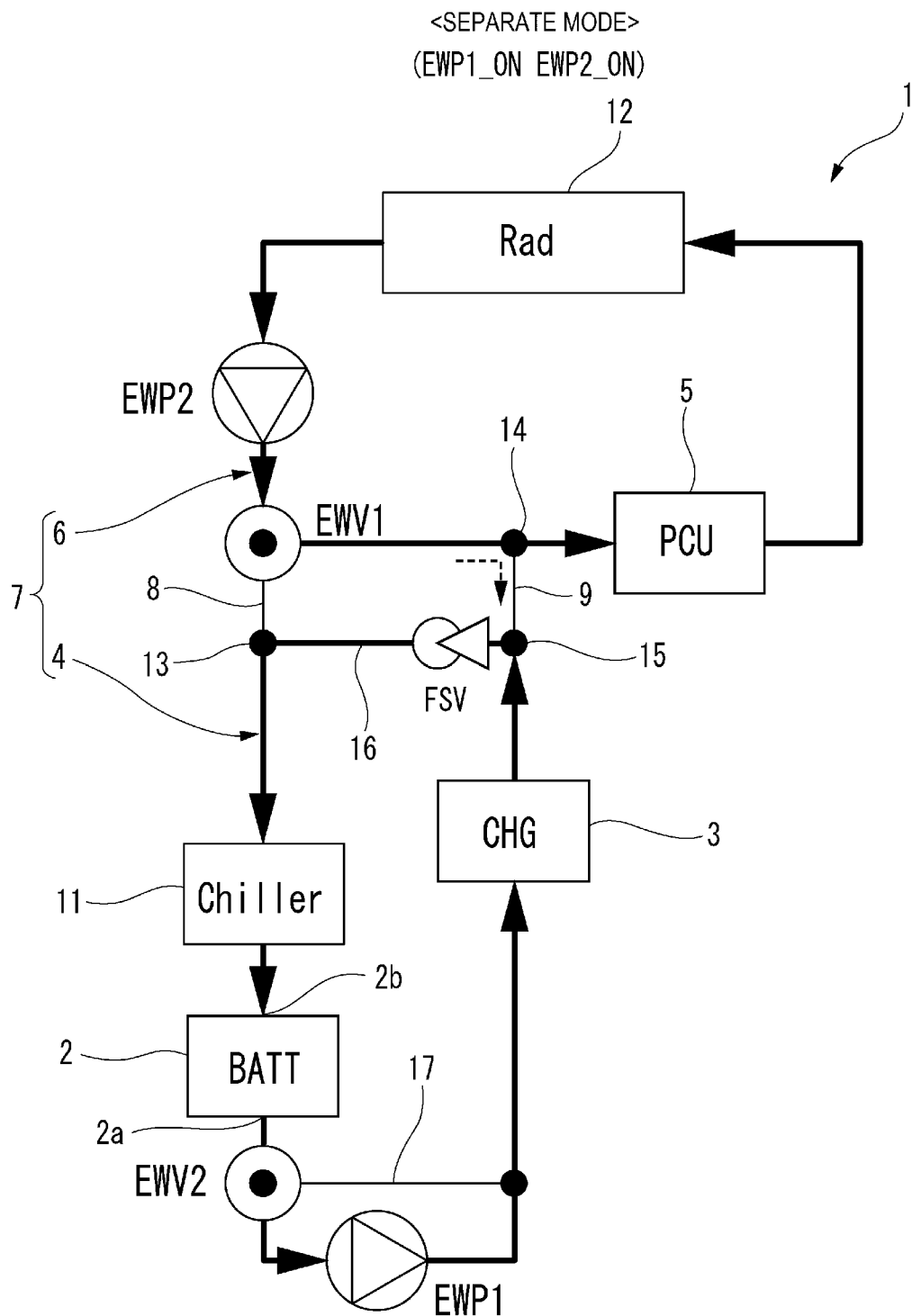
FIG. 3 is an explanatory view showing a flow of a heat medium in a separate mode (a first pump EWP1 and the second pump EWP2 are driven) in the temperature adjustment circuit of FIG. 1.

As shown in FIG. 3, in the separate mode (EWP1_ON), the first pump EWP1 is driven with the second electromagnetic switching valve EWV2 set to the blocking state and the electromagnetic check valve FSV set to an open state, and the heat medium discharged by the first pump EWP1 is circulated in the order of the charger 3, the chiller 11, and the battery 2. As a result, the heat medium cooled by the chiller 11 exchanges heat with the battery 2 and the charger 3, and the battery 2 and the charger 3 are cooled appropriately.

[Second Temperature Adjustment Circuit]

The second temperature adjustment circuit 6 includes: a second pump EWP2 that circulates the heat medium in the circuit; the first electromagnetic switching valve EWV1 that is disposed downstream of the second pump EWP2 and switches between the separate mode and the series mode; a power conversion device 5 disposed downstream of the first electromagnetic switching valve EWV1; and a radiator 12 that is disposed downstream of the power conversion device 5 and cools the heat medium.

The first electromagnetic switching valve EWV1 is, for example, an electromagnetic three-way valve that allows connection between a flow path on the second pump EWP2 side and a flow path on the power conversion device 5 side and that blocks connection between the flow path on the second pump EWP2 side and the first coupling path 8 to be described later in the separate mode. On the other hand, the first electromagnetic switching valve EWV1 blocks connection between a flow path on the second pump EWP2 side and a flow path on the power conversion device 5 side and allows connection between the flow path on the second pump EWP2 side and the first coupling path 8 to be described later in the series mode. The power conversion device 5 includes at least one of: an inverter that converts DC power into AC power and converts AC power into DC power; and a DC-DC converter that steps up or steps down a DC voltage.

Figure 2:
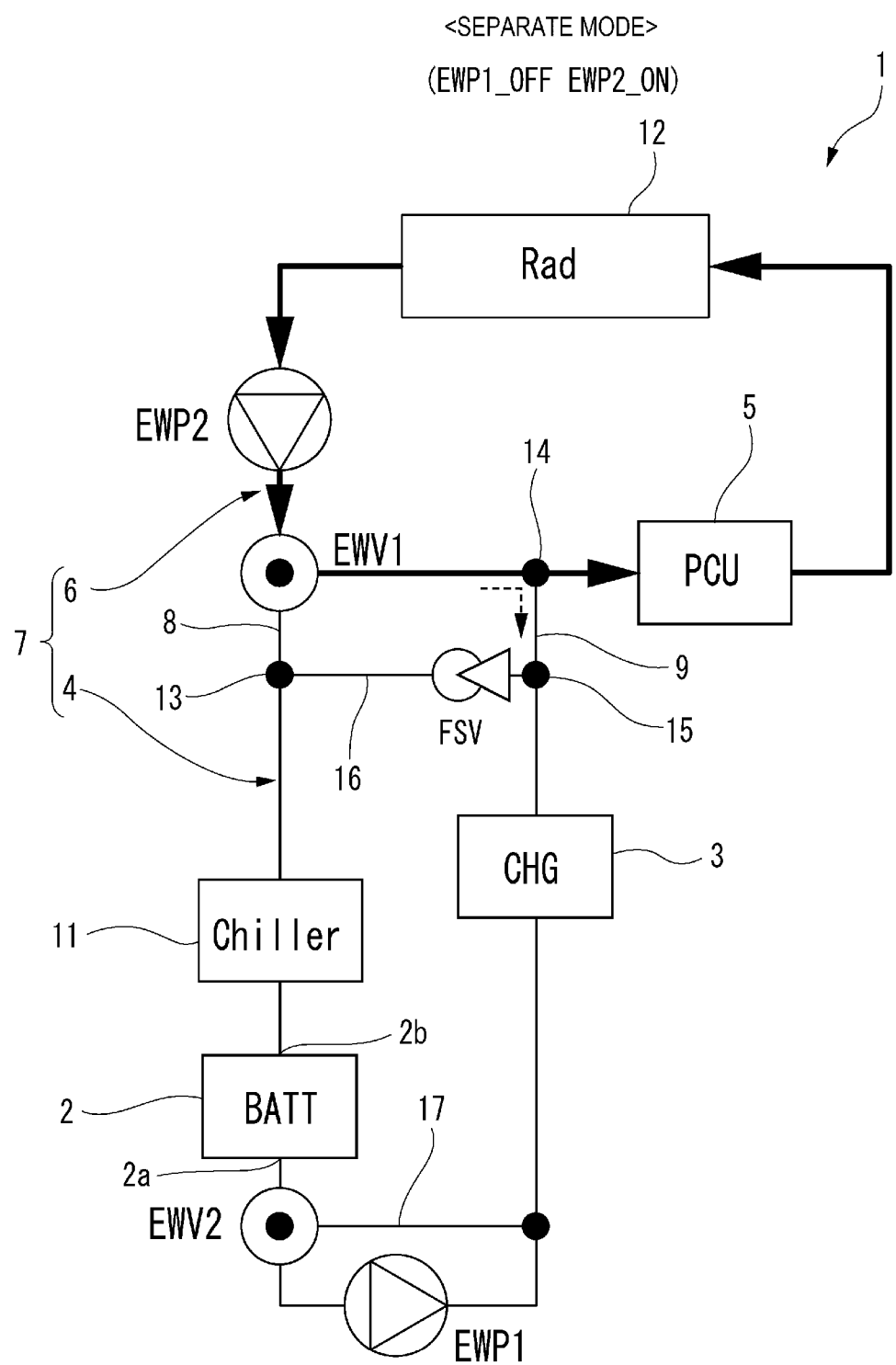
FIG. 2 is an explanatory view showing a flow of a heat medium in a separate mode (only a second pump EWP2 is driven) in the temperature adjustment circuit of FIG. 1.

As shown in FIGS. 2 and 3, in the separate mode (EWP2_ON), by driving the second pump EWP2, the heat medium discharged from the second pump EWP2 is circulated in the order of the power conversion device 5 and the radiator 12. As a result, the heat medium cooled by the radiator 12 exchanges heat with the power conversion device 5, and the power conversion device 5 is cooled appropriately.

[Coupled Circuit]

The coupling paths 8, 9 include the first coupling path 8 and the second coupling path 9. The first coupling path 8 couples the first electromagnetic switching valve EWV1 of the second temperature adjustment circuit 6 and a first connection portion 13 of the first temperature adjustment circuit 4, and the second coupling path 9 couples a connection portion 14 of the second temperature adjustment circuit 6 and a second connection portion 15 of the first temperature adjustment circuit 4. The connection portion 14 is located downstream of the first electromagnetic switching valve EWV1 in the second temperature adjustment circuit 6 and upstream of the power conversion device 5, the first connection portion 13 is located downstream of the electromagnetic check valve FSV in the first temperature adjustment circuit 4 and upstream of the chiller 11, and the second connection portion 15 is located downstream of the charger 3 in the first temperature adjustment circuit 4 and upstream of the electromagnetic check valve FSV.

A path between the first connection portion 13 and the second connection portion 15 in the first temperature adjustment circuit 4, that is, a path in which the electromagnetic check valve FSV in the first temperature adjustment circuit 4 are arranged, functions as a first branch path 16 that bypasses a portion of the coupled circuit 7. In the first branch path 16, the heat medium flows from the second connection portion 15 toward the first connection portion 13 in the separate mode. In other words, the second connection portion 15 is located upstream of the first connection portion 13 in a flow direction of the heat medium that flows through the first branch path 16.

Figure 4:
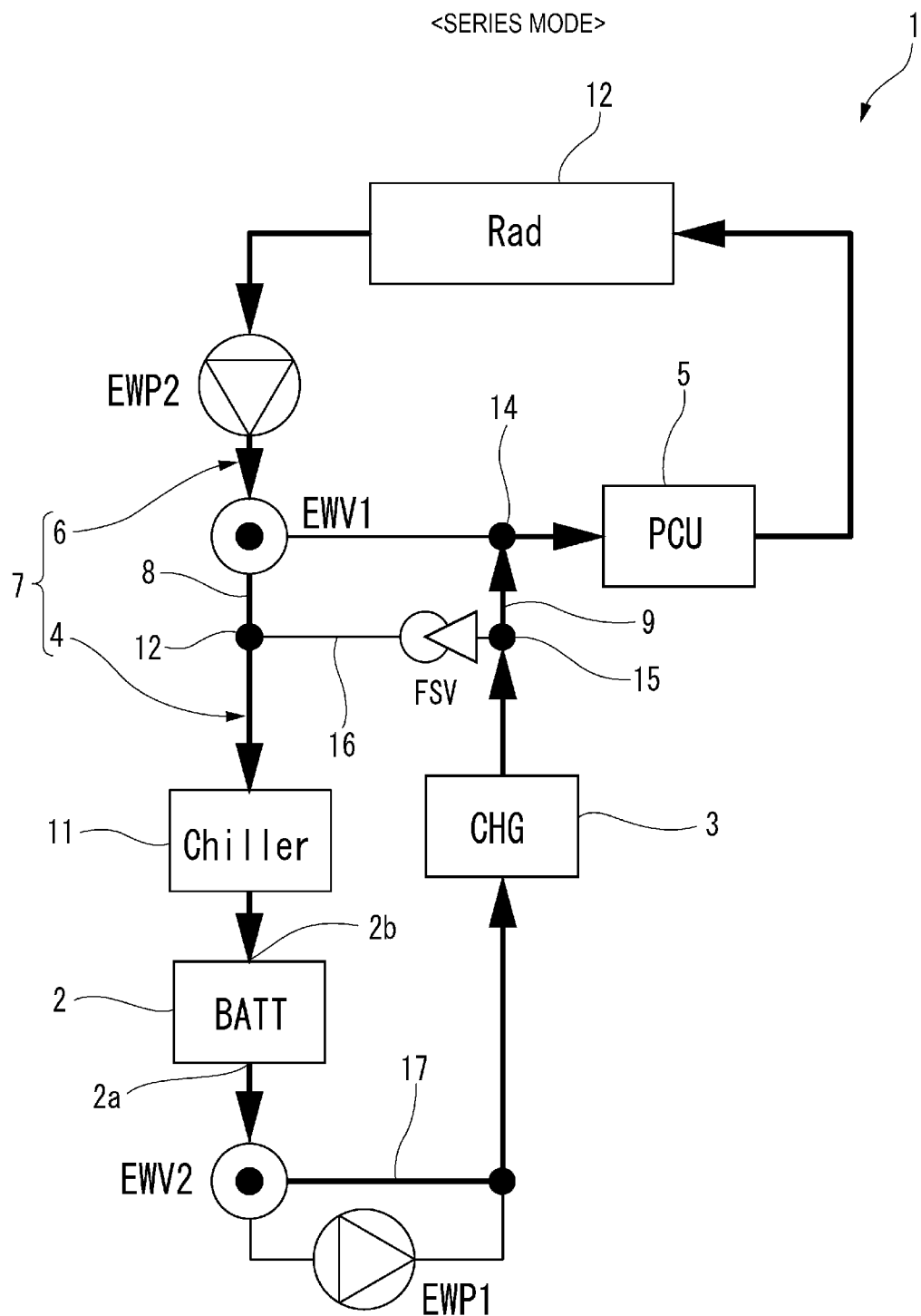
FIG. 4 is an explanatory view showing a flow of a heat medium in a series mode in the temperature adjustment circuit of FIG. 1.

As shown in FIG. 4, in the series mode in which the heat medium circulates in the coupled circuit 7, the first pump EWP1 is stopped, and the heat medium is circulated by driving the second pump EWP2. As a result, the heat medium discharged from the second pump EWP2 circulates in the order of the chiller 11, the battery 2, the charger 3, the power conversion device 5, and the radiator 12, and the battery 2, the charger 3, and the power conversion device 5 are cooled. In the series mode, the electromagnetic check valve FSV is closed to stop circulation of the heat medium via the first branch path 16, and the second electromagnetic switching valve EWV2 is set to the passage allowing state to stop circulation of the heat medium via the first pump EWP1. Accordingly, in the series mode, pressure loss due to passage of the heat medium through the first pump EWP1 can be reduced, and induced rotation of the first pump EWP1 can be prevented when not in use, thereby appropriately protecting the first pump EWP1.

[Control Device]

The control device 10 inputs temperature information of the battery 2 and the power conversion device 5, and rotation speed information of the first pump EWP1 and the second pump EWP2, and controls the first pump EWP1, the second pump EWP2, the first electromagnetic switching valve EWV1, the second electromagnetic switching valve EWV2, and the electromagnetic check valve FSV, based on determination according to the input information, so as to automatically switch the temperature adjustment circuit 1 between the separate mode and the series mode.

In a case where the control device 10 cools the battery 2, the charger 3, and the power conversion device 5 in the separate mode, the control device 10 drives the first pump EWP1 and the second pump EWP2 with the first electromagnetic switching valve EWV1 and the second electromagnetic switching valve EWV2 switched to the separate mode side and with energization to the electromagnetic check valve FSV turned off, so as to operate the temperature adjustment circuit 1 in the separate mode. In the separate mode, as shown in FIG. 2, the heat medium may be circulated only in the second temperature adjustment circuit 6. Further, as shown in FIG. 2, the heat medium may be further circulated in the temperature adjustment circuit 1 in accordance with the temperature of the battery 2 and the like in a state where the heat medium is being circulated only in the second temperature adjustment circuit 6.

As shown in FIG. 2, in a state where the heat medium circulates in the second temperature adjustment circuit 6, the supply pressure of the heat medium due to the second pump EWP2 is applied to the first temperature adjustment circuit 4 via the second coupling path 9, and when the first pump EWP1 of the first temperature adjustment circuit 4 is operated in this state, an excessive supply pressure of the heat medium may be applied to the battery 2.

In the temperature adjustment circuit 1 of the embodiment of the present invention, by disposing the first pump EWP1 between an outlet 2a of the heat medium of the battery 2 and the second connection portion 15 in the first temperature adjustment circuit 4, even when the supply pressure on the second temperature adjustment circuit 6 side is applied to the second connection portion 15, since the supply pressure gradually decreases in a path from the second connection portion 15 to an inlet 2b of the heat medium of the battery 2 (for example, a flow path including the first branch path 16) in the first temperature adjustment circuit 4, the supply pressure is further prevented from increasing in the path from the second connection portion 15 to the inlet 2b of the heat medium of the battery 2.

In the temperature adjustment circuit 1 according to the embodiment of the present invention, in addition to disposing the first pump EWP1 between the outlet 2a of the heat medium of the battery 2 and the second connection portion 15 in the first temperature adjustment circuit 4, a pressure loss body is interposed between the first pump EWP1 and the inlet 2b of the heat medium of the battery 2. For example, in the present embodiment, by interposing the charger 3, the first branch path 16, and the chiller 11 serving as pressure loss bodies between the first pump EWP1 and the inlet 2b of the heat medium of the battery 2, a region where the supply pressure of the heat medium becomes high in the first temperature adjustment circuit 4 (a broken line region in FIG. 5A) is limited, and the supply pressure of the heat medium applied to the battery 2 is prevented from increasing. Thereby, voltage withstand requirement of the battery 2, which has a relatively large component area, can be decreased, and the cost or size of the battery 2 can be prevented from increasing.

Figure 5A:
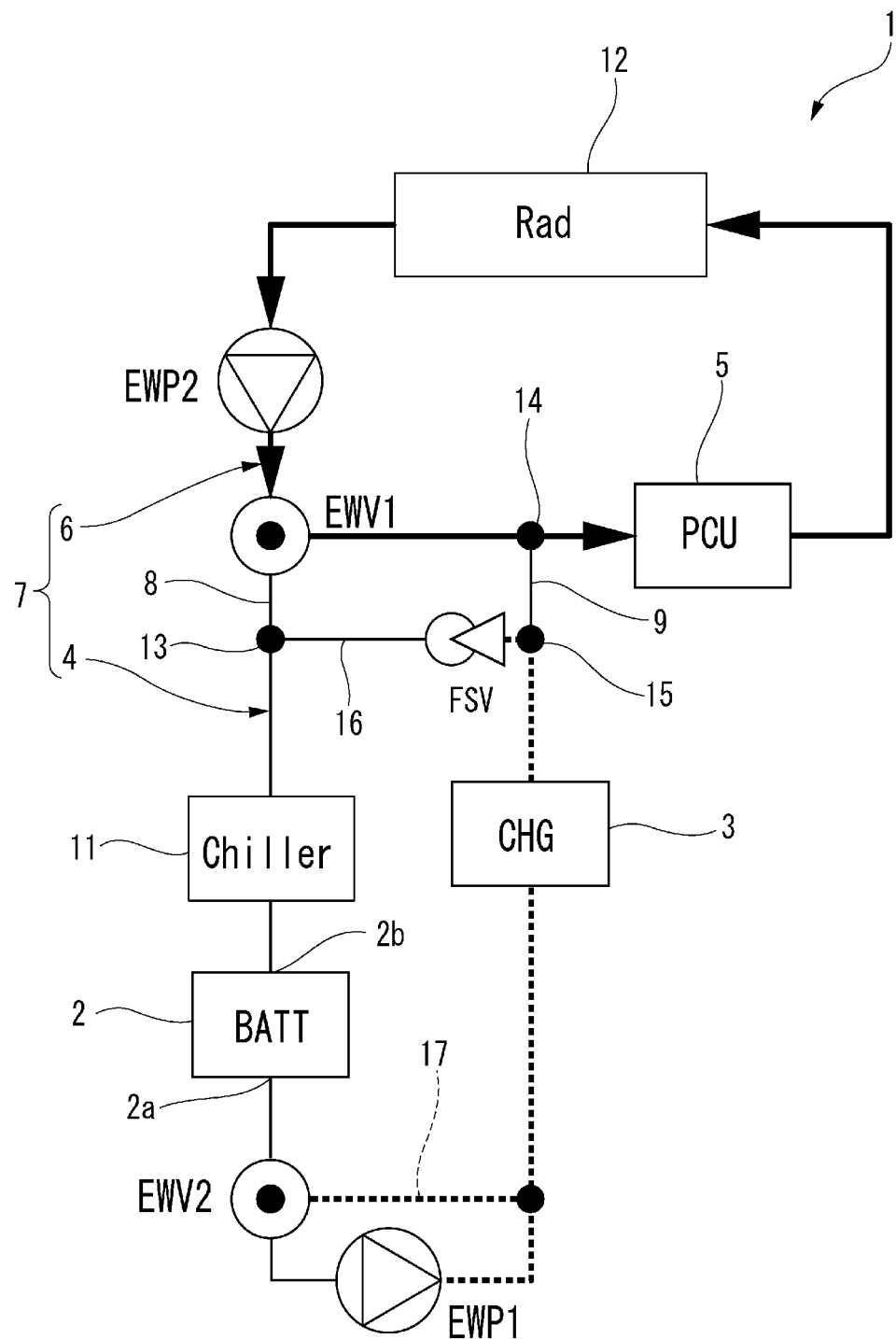
FIG. 5A is an explanatory view showing a region where a supply pressure of the heat medium becomes high in the separate mode (the first pump EWP1 and the second pump EWP2 are driven) in the temperature adjustment circuit of FIG. 1 with a broken line.
Figure 5B:
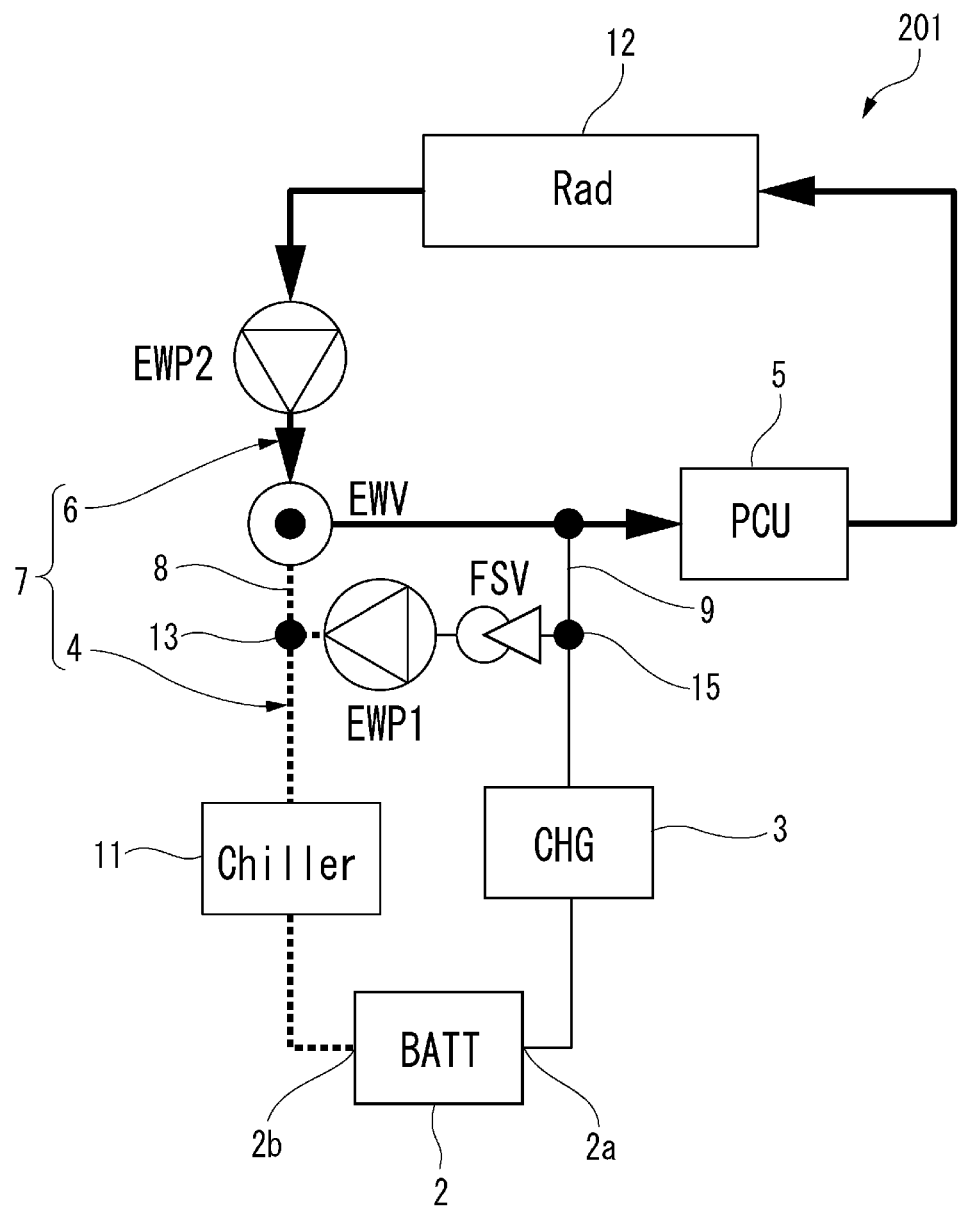
FIG. 5B is an explanatory view showing the region where the supply pressure of the heat medium becomes high in the separate mode (the first pump EWP1 and the second pump EWP2 are driven) in the temperature adjustment circuit of a reference example with a broken line.

In a temperature adjustment circuit 201 of a reference example shown in FIG. 5B, a region where the supply pressure of the heat medium becomes high is shown by a broken line. In the temperature adjustment circuit 201 of FIG. 5B, the first pump EWP1 is disposed in the first branch path 16, and the pressure of the heat medium, which is increased by the second pump EWP2 on the second temperature adjustment circuit 6 side, is also applied to the second connection portion 15, and the supply pressure of the heat medium is further increased by the first pump EWP1. Therefore, the supply pressure is particularly high in the area of the broken line. Although the chiller 11 is interposed between the first pump EWP1 and the inlet 2b of the heat medium of the battery 2, since the pressure loss of the heat medium is small, the supply pressure of the heat medium applied to the battery 2 becomes high.

[Control Method]

Figure 6:
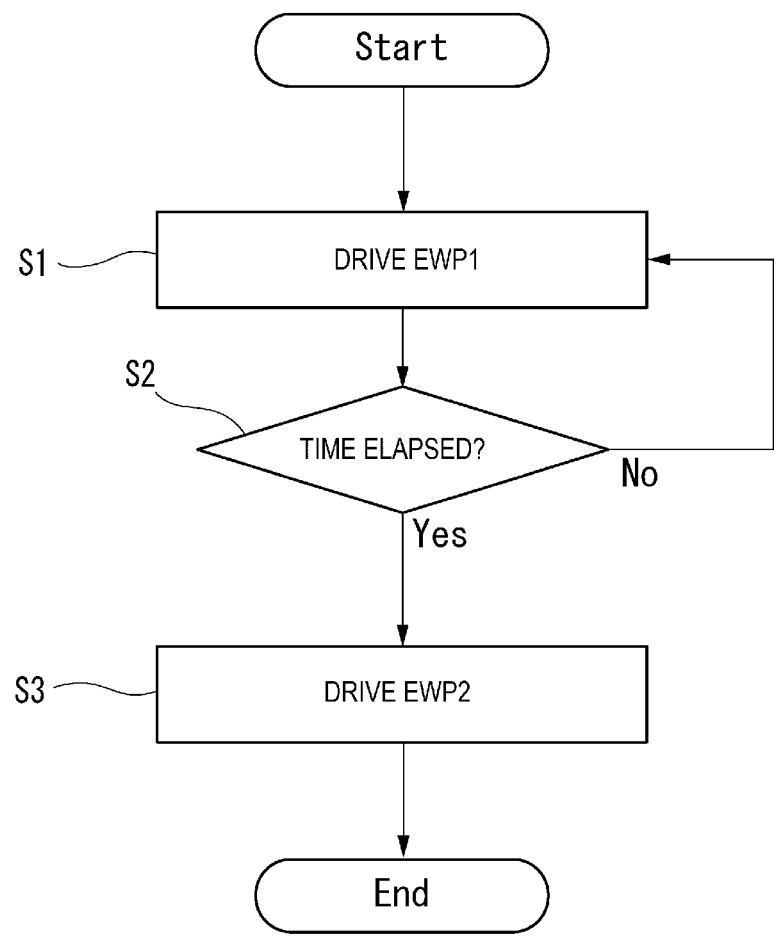
FIG. 6 is a flowchart showing a control procedure of the temperature adjustment circuit of FIG. 1.

As shown in FIG. 6, when the control device 10 drives both the first pump EWP1 and the second pump EWP2 from a stop state of the first pump EWP1 and the second pump EWP2 in order to operate the temperature adjustment circuit 1 in the separate mode, the control device 10 starts driving of the first pump EWP1 before starting driving of the second pump EWP2. Specifically, after starting driving of the first pump EWP1 (S1 in FIG. 6), the control device 10 determines passage of a predetermined time (S2 in FIG. 6), and starts driving the second pump EWP2 when a determination result thereof is Yes (S3 in FIG. 6).

According to such control method, since the flow of the second temperature adjustment circuit 6 is generated after the flow of the first temperature adjustment circuit 4 is generated, by further circulating the heat medium in the second temperature adjustment circuit 6 in a state in which the heat medium is circulating in the first temperature adjustment circuit 4, the supply pressure of the heat medium applied to the battery 2 can be prevented from increasing. Thereby, voltage withstand requirement of the battery 2, which has a relatively large component area, can be decreased, and the cost or size of the battery 2 can be prevented from increasing.

In the series mode in which the control device 10 stops the first pump EWP1 and circulates the heat medium in the coupled circuit 7 by driving the second pump EWP2, the control device 10 sets the second electromagnetic switching valve EWV2 to the passage allowing state to stop circulation of the heat medium via the first pump EWP1. Accordingly, in the series mode, pressure loss due to passage of the heat medium through the first pump EWP1 can be reduced, and induced rotation of the first pump EWP1 can be prevented when not in use, thereby appropriately protecting the first pump EWP1.

[Vehicle]

Figure 7:
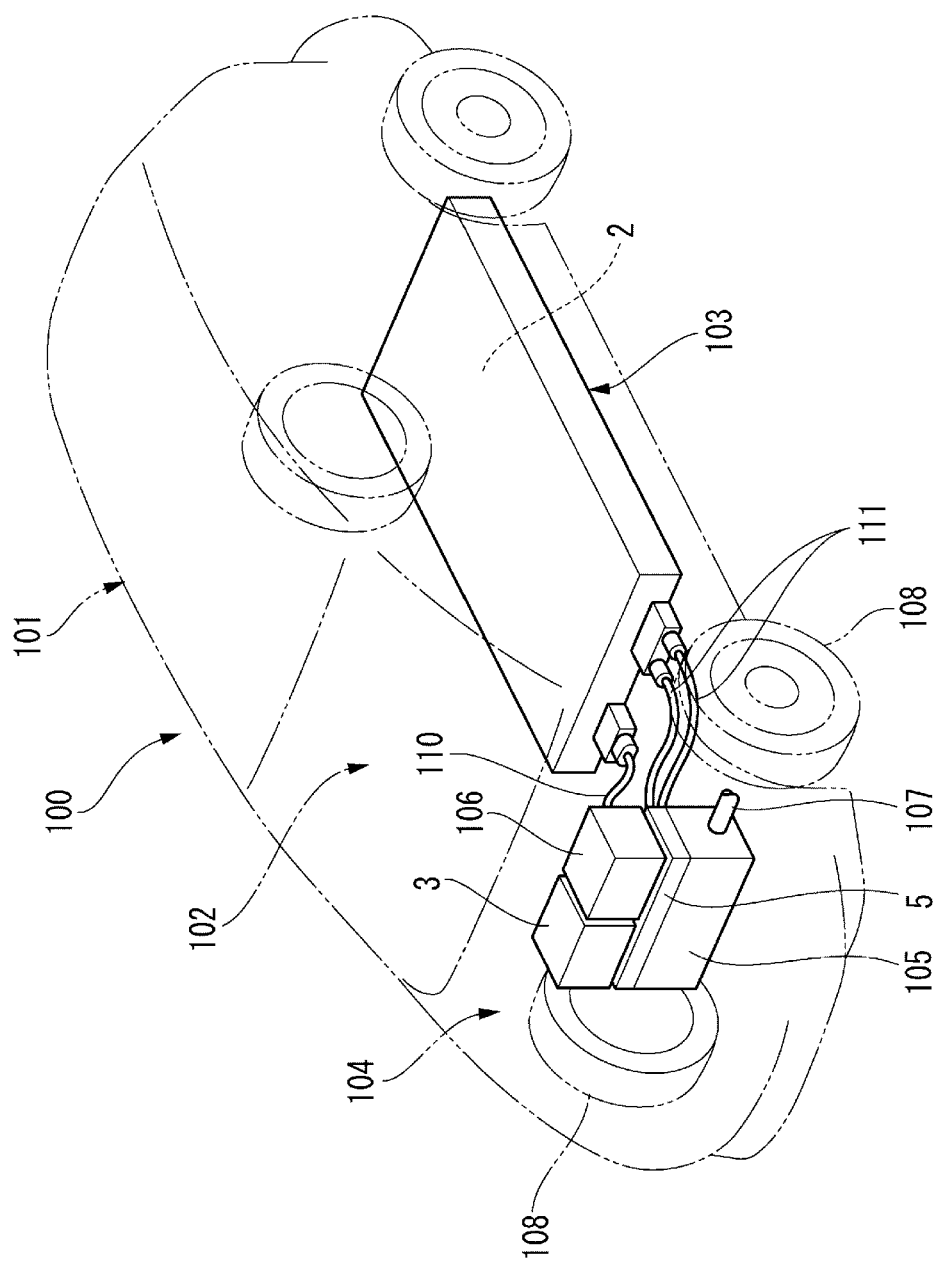
FIG. 7 is a perspective view showing a schematic configuration of an electric vehicle in which the temperature adjustment circuit of the present embodiment can be used.

FIG. 7 is a perspective view showing a schematic configuration of an electric vehicle 100 in which the temperature adjustment circuit 1 of the present embodiment can be used. The electric vehicle 100 may be an electric vehicle or a fuel cell vehicle having only an electric motor as a drive source, and may be a hybrid vehicle having an electric motor and an internal combustion engine, whereas in the following description, an electric vehicle will be described as an example.

A vehicle body 101 of the electric vehicle 100 is equipped with a battery case 103 that houses the battery 2 in an underfloor portion of a cabin 102. A motor room 104 is provided in a front portion of the electric vehicle 100. The motor 105, the power conversion device 5, a branch unit 106, the charger 3, and the like are provided in the motor room 104.

A rotational driving force of the motor 105 is transmitted to a shaft 107. Front wheels 108 of the electric vehicle 100 are respectively connected to both end portions of the shaft 107. The power conversion device 5 is disposed on an upper side of the motor 105 and is directly fastened and fixed to a case of the motor 105. The power conversion device 5 is electrically connected to a connector of the battery case 103 via a power cable 111. The power conversion device 5 is electrically connected to the motor 105 via, for example, a three-phase bus bar. The power conversion device 5 controls driving of the motor 105 via electric power supplied from the battery 2.

The branch unit 106 and the charger 3 are arranged in parallel in a left-right direction. The branch unit 106 and the charger 3 are arranged above the power conversion device 5. The branch unit 106 and the charger 3 are arranged apart from the power conversion device 5. The branch unit 106 and the battery case 103 are electrically connected to each other via a cable 110 having connectors at both ends thereof.

The branch unit 106 is electrically connected to the charger 3. The charger 3 is connected to a general external power supply such as a household power supply, so as to charge the battery 2. The charger 3 and the branch unit 106 are electrically connected to each other via a cable (not shown) having connectors at both ends thereof.

The above embodiment may be appropriately modified, improved, or the like. For example, in the above-described embodiment, the power conversion device 5 that supplies electric power to the motor is cooled by the second temperature adjustment circuit 6, whereas the motor 105 may be cooled by the second temperature adjustment circuit 6, and the motor 105 and the power conversion device 5 may be cooled by the second temperature adjustment circuit 6.

At least the following matters are described in the present specification. Corresponding components in the above-described embodiments are shown in parentheses, without being limited thereto.

(1) A temperature adjustment circuit which includes:

a first temperature adjustment circuit (the first temperature adjustment circuit 4) configured to exchange heat with a battery (the battery 2);

a second temperature adjustment circuit (the second temperature adjustment circuit 6) configured to exchange heat with at least one of a motor (the motor 105) and a power conversion device (the power conversion device 5) that supplies electric power to the motor;

a first pump (the first pump EWP1) configured to circulate a heat medium in the first temperature adjustment circuit;

a coupling path (the first coupling path 8, the second coupling path 9) that couples the first temperature adjustment circuit and the second temperature adjustment circuit to form a coupled circuit (the coupling path 7);

a first switching unit (the first electromagnetic switching valve EWV1) capable of switching between a circulation state in which the heat medium circulates in the coupled circuit and a non-circulation state in which the heat medium does not circulate in the coupled circuit;

a first branch path (the first branch path 16) configured to bypass a part of the coupled circuit; and a first connection portion (the first connection portion 13) and a second connection portion (the second connection portion 15) that are configured to connect the first branch path and the coupled circuit, in which the second connection portion is located upstream of the first connection portion in a flow direction of the heat medium that flows through the first branch path, and in which the first pump is disposed between an outlet of the heat medium (the outlet 2a) of the battery and the second connection portion in the first temperature adjustment circuit.

According to (1), by disposing the first pump between the outlet of the heat medium of the battery and the second connection portion in the first temperature adjustment circuit, when the heat medium is further circulated in the first temperature adjustment circuit in a state in which the heat medium is circulating in the second temperature adjustment circuit, a supply pressure of the heat medium applied to a battery can be prevented from increasing.

That is, by disposing the first pump between an outlet of the heat medium of the battery and the second connection portion in the first temperature adjustment circuit, even when the supply pressure on the second temperature adjustment circuit side is applied to the second connection portion, since the supply pressure gradually decreases in a path from the second connection portion to an inlet of the heat medium of the battery (for example, a flow path including the first branch path in the first temperature adjustment circuit, the supply pressure is further prevented from increasing in the path from the second connection portion to the inlet of the heat medium of the battery. Therefore, the supply pressure of the heat medium applied to the battery is prevented from increasing.

(2) In the temperature adjustment circuit according to (1),
the first temperature adjustment circuit includes a heat exchanger (the chiller 11), and
the heat exchanger is disposed between the first pump and an inlet of the heat medium (the inlet 2b) of the battery in the first temperature adjustment circuit.

According to (2), by further disposing the heat exchanger, which serves as another pressure loss body, between the first pump and the inlet of the heat medium of the battery, the supply pressure of the heat medium applied to the battery can be decreased.

(3) In the temperature adjustment circuit according to (1) or (2),
the first temperature adjustment circuit includes a charger (the charger 3), and
the charger is disposed between the first pump and an inlet of the heat medium (the inlet 2b) of the battery in the first temperature adjustment circuit.

According to (3), by further disposing the charger, which serves as another pressure loss body, between the first pump and the inlet of the heat medium of the battery, the supply pressure of the heat medium applied to the battery can be decreased.

(4) In the temperature adjustment circuit according to any one of (1) to (3),
the first temperature adjustment circuit includes:
a second branch path (the second branch path 17) configured to bypass the first pump; and
a second switching unit (the second electromagnetic switching valve EWV2) capable of switching between a passage allowing state in which the heat medium passes through the second branch path and a blocking state in which the heat medium does not pass through the second branch path.

According to (4), by setting the second switching unit to the passage allowing state in the circulating state of the coupled circuit, the pressure loss due to passage of the heat medium through the first pump can be reduced. In addition, induced rotation of the first pump can be prevented when not in use, thereby appropriately protecting the first pump.

(5) In the temperature adjustment circuit according to any one of (1) to (4),
the temperature adjustment circuit includes:
a second pump (the second pump EWP2) configured to circulate the heat medium in the second temperature adjustment circuit; and
a control device (the control device 10) configured to control the first pump and the second pump, and
when the control device operates both the first pump and the second pump from a stop state of the first pump and the second pump, the control device starts operation of the first pump before starting operation of the second pump.

According to (5), when the control device operates both the first pump and the second pump from a stop state of the first pump and the second pump, the control device starts operation of the first pump before starting operation of the second pump. Thereby, the flow of the second temperature adjustment circuit can be generated after the flow of the first temperature control circuit is generated. In this way, by further circulating the heat medium in the second temperature adjustment circuit in a state in which the heat medium is circulating in the first temperature adjustment circuit, the supply pressure of the heat medium applied to the battery can be prevented from increasing. Thereby, voltage withstand requirement of the battery, which has a relatively large component area, can be decreased, and the cost or size of the battery can be prevented from increasing.

(6) A control method for a temperature adjustment circuit which includes:
a first temperature adjustment circuit (the first temperature adjustment circuit 4) configured to exchange heat with a battery (the battery 2);
a second temperature adjustment circuit (the second temperature adjustment circuit 6) configured to exchange heat with at least one of a motor (the motor 105) and a power conversion device (the power conversion device 5) that supplies electric power to the motor;
a first pump (the first pump EWP1) configured to circulate a heat medium in the first temperature adjustment circuit;
a second pump (the second pump EWP2) configured to circulate the heat medium in the second temperature adjustment circuit;
a coupling path (the first coupling path 8, the second coupling path 9) that couples the first temperature adjustment circuit and the second temperature adjustment circuit to form a coupled circuit (the coupling path 7);
a first switching unit (the first electromagnetic switching valve EWV1) capable of switching between a circulation state in which the heat medium circulates in the coupled circuit and a non-circulation state in which the heat medium does not circulate in the coupled circuit;
a first branch path (the first branch path 16) configured to bypass a part of the coupled circuit; and
a first connection portion (the first connection portion 13) and a second connection portion (the second connection portion 15) that are configured to connect the first branch path and the coupled circuit,
the second connection portion is located upstream of the first connection portion when the heat medium flows through the first branch path,
the first pump is disposed between an outlet of the heat medium (the outlet 2a) of the battery and the second connection portion in the first temperature adjustment circuit, and
when both the first pump and the second pump are operated from a stop state of the first pump and the second pump, operation of the first pump is started before operation of the second pump is started.

According to (6), when both the first pump and the second pump are operated from a stop state of the first pump and the second pump, operation of the first pump is started before starting operation of the second pump. Thereby, the flow of the second temperature adjustment circuit can be generated after the flow of the first temperature control circuit is generated. In this way, by further circulating the heat medium in the second temperature adjustment circuit in a state in which the heat medium is circulating in the first temperature adjustment circuit, the supply pressure of the heat medium applied to the battery can be prevented from increasing. Thereby, voltage withstand requirement of the battery, which has a relatively large component area, can be decreased, and the cost or size of the battery can be prevented from increasing.

(7) In the control method for the temperature adjustment circuit according to (6),
the first temperature adjustment circuit includes:
a second branch path (the second branch path 17) configured to bypass the first pump; and
a second switching unit (the second electromagnetic switching valve EWV2) capable of switching between a passage allowing state in which the heat medium passes through the second branch path and a blocking state in which the heat medium does not pass through the second branch path, the control method sets the second switching unit to the passage allowing state in the circulation state of the coupled circuit.

According to (7), by setting the second switching unit to the passage allowing state in the circulating state of the coupled circuit, the pressure loss due to passage of the heat medium through the first pump can be reduced. In addition, induced rotation of the first pump can be prevented when not in use, thereby appropriately protecting the first pump.

The invention claimed is:

1. A temperature adjustment circuit comprising:
   a first temperature adjustment circuit configured to exchange heat with a battery;
   a second temperature adjustment circuit configured to exchange heat with at least one of a motor and a power conversion device that supplies electric power to the motor;
   a first pump configured to circulate a heat medium in the first temperature adjustment circuit;
   a coupling path that couples the first temperature adjustment circuit and the second temperature adjustment circuit to form a coupled circuit;
   a first switching unit capable of switching between a circulation state in which the heat medium circulates in the coupled circuit and a non-circulation state in which the heat medium does not circulate in the coupled circuit;
   a first branch path configured to bypass a part of the coupled circuit; and
   a first connection portion and a second connection portion that are configured to connect the first branch path and the coupled circuit,
   wherein the second connection portion is located upstream of the first connection portion in a flow direction of the heat medium that flows through the first branch path,
   wherein the first pump is disposed between an outlet of the heat medium of the battery and the second connection portion in the first temperature adjustment circuit, and
   wherein the first temperature adjustment circuit includes:
      a second branch path configured to bypass the first pump; and
      a second switching unit capable of switching between a passage allowing state in which the heat medium passes through the second branch path and a blocking state in which the heat medium does not pass through the second branch path.

2. The temperature adjustment circuit according to claim 1,
   wherein the first temperature adjustment circuit includes a heat exchanger, and
   wherein the heat exchanger is disposed between the first pump and an inlet of the heat medium of the battery in the first temperature adjustment circuit.

3. The temperature adjustment circuit according to claim 1,
   wherein the first temperature adjustment circuit includes a charger, and
   wherein the charger is disposed between the first pump and an inlet of the heat medium of the battery in the first temperature adjustment circuit.

4. A temperature adjustment circuit comprising:
   a first temperature adjustment circuit configured to exchange heat with a battery;
   a second temperature adjustment circuit configured to exchange heat with at least one of a motor and a power conversion device that supplies electric power to the motor;
   a first pump configured to circulate a heat medium in the first temperature adjustment circuit;
   a coupling path that couples the first temperature adjustment circuit and the second temperature adjustment circuit to form a coupled circuit;
   a first switching unit capable of switching between a circulation state in which the heat medium circulates in the coupled circuit and a non-circulation state in which the heat medium does not circulate in the coupled circuit;
   a first branch path configured to bypass a part of the coupled circuit; and
   a first connection portion and a second connection portion that are configured to connect the first branch path and the coupled circuit,
   wherein the second connection portion is located upstream of the first connection portion in a flow direction of the heat medium that flows through the first branch path,
   wherein the first pump is disposed between an outlet of the heat medium of the battery and the second connection portion in the first temperature adjustment circuit,
   wherein the temperature adjustment circuit comprises:
      a second pump configured to circulate the heat medium in the second temperature adjustment circuit; and
      a control device configured to control the first pump and the second pump, and
   wherein when the control device operates both the first pump and the second pump from a stop state of the first pump and the second pump in the non-circulation state of the coupled circuit, the control device starts operation of the first pump before starting operation of the second pump.

5. A control method for a temperature adjustment circuit comprising:
   a first temperature adjustment circuit configured to exchange heat with a battery;
   a second temperature adjustment circuit configured to exchange heat with at least one of a motor and a power conversion device that supplies electric power to the motor;
   a first pump configured to circulate a heat medium in the first temperature adjustment circuit;
   a second pump configured to circulate the heat medium in the second temperature adjustment circuit;
   a coupling path that couples the first temperature adjustment circuit and the second temperature adjustment circuit to form a coupled circuit;
   a first switching unit capable of switching between a circulation state in which the heat medium circulates in the coupled circuit and a non-circulation state in which the heat medium does not circulate in the coupled circuit;
   a first branch path configured to bypass a part of the coupled circuit; and
   a first connection portion and a second connection portion that are configured to connect the first branch path and the coupled circuit,
   wherein the second connection portion is located upstream of the first connection portion when the heat medium flows through the first branch path, wherein the first pump is disposed between an outlet of the heat medium of the battery and the second connection portion in the first temperature adjustment circuit, and wherein when both the first pump and the second pump are operated from a stop state of the first pump and the second pump in the non-circulation state of the coupled circuit, operation of the first pump is started before operation of the second pump is started.

6. The control method for the temperature adjustment circuit according to claim 5, wherein the first temperature adjustment circuit includes:
   a second branch path configured to bypass the first pump; and
   a second switching unit capable of switching between a passage allowing state in which the heat medium passes through the second branch path and a blocking state in which the heat medium does not pass through the second branch path, wherein the control method sets the second switching unit to the passage allowing state in the circulation state of the coupled circuit.

\* \* \* \* \*